United States Patent [19]

Maeda et al.

[11] Patent Number: 4,711,052
[45] Date of Patent: Dec. 8, 1987

[54] VEHICLE DOOR STRUCTURE

[75] Inventors: Tatsuo Maeda; Takeji Ohya, both of Hiroshima, Japan

[73] Assignee: Mazda Motor Corporation, Japan

[21] Appl. No.: 937,543

[22] Filed: Dec. 3, 1986

[30] Foreign Application Priority Data

Dec. 5, 1985 [JP] Japan ................................. 60-274418

[51] Int. Cl.⁴ ............................................. B60J 5/04
[52] U.S. Cl. ....................................... 49/502; 49/503
[58] Field of Search .................... 49/502, 503; 296/146

[56] References Cited

U.S. PATENT DOCUMENTS

| | | | |
|---|---|---|---|
| 3,370,384 | 2/1968 | Hafer et al. | 49/502 |
| 4,411,103 | 10/1983 | Ohmura et al. | 49/502 |
| 4,416,088 | 11/1983 | Feucht et al. | 49/502 |
| 4,512,240 | 4/1985 | Mahler et al. | 49/503 |
| 4,648,208 | 3/1987 | Baldamus et al. | 49/502 |
| 4,662,115 | 5/1987 | Ohya et al. | 49/502 |

FOREIGN PATENT DOCUMENTS 56-163015 12/1981 Japan .

Primary Examiner—Philip C. Kannan
Attorney, Agent, or Firm—Gerald J. Ferguson, Jr.; Michael P. Hoffman; Michael J. Foycik, Jr.

[57] ABSTRACT

A vehicle door structure comprises an inner panel on which functional parts are to be mounted, and an outer panel having a central opening. The inner panel and the outer panel are lap-bonded together at the front edge, the bottom edge and the rear edge. The portion of the outer panel surrounding the central opening is bonded to the inner panel. Front and rear edge portions of the door body are formed of closed cross-section portions. The outer side of the outer panel is covered with an outer plate of synthetic resin.

16 Claims, 8 Drawing Figures

1

VEHICLE DOOR STRUCTURE

BACKGROUND OF THE INVENTION

1. Field of the Invention

This invention relates to a vehicle door structure, e.g., a front door of a vehicle.

2. Description of the Prior Art

In Japanese Unexamined Utility Model Publication No. 56(1981)-163015, there is disclosed a vehicle door structure comprising synthetic resin inner and outer panels which are lap-bonded together at the front end, the bottom end and the rear end. Though being advantageous in that the door body can be reduced in weight and the external appearance of the door body can be improved, the door structure is disadvantageous in that the rigidity of the body itself is insufficient and at the same time the mounting rigidity of the functional parts on the inner panel is insufficient. Further, since the inner panel and the outer panel are arranged to cover the entire area below the belt line, workability in mounting the functional parts such as the window regulator, the door hinges and the like on the inner panel is bad.

SUMMARY OF THE INVENTION

In view of the foregoing observations and description, the primary object of the present invention is to provide a vehicle door structure in which the rigidity of the door body itself and the mounting rigidity of the functional parts on the inner panel can be enhanced and at the same time, workability in mounting the functional parts on the inner panel can be improved.

In accordance with the present invention, there is provided a vehicle door structure comprising an inner panel on which functional parts are to be mounted, and an outer panel having a central opening, the inner panel and the outer panel being lap-bonded together at the front edge, the bottom edge and the rear edge, the portion of the outer panel surrounding the central opening being bonded to the inner panel, at least front and rear edge portions of the door body being formed of closed cross-section portions, and the outer side of the outer panel being covered with an outer plate of synthetic resin.

DESCRIPTION OF THE PREFERRED EMBODIMENT

Figure 1:
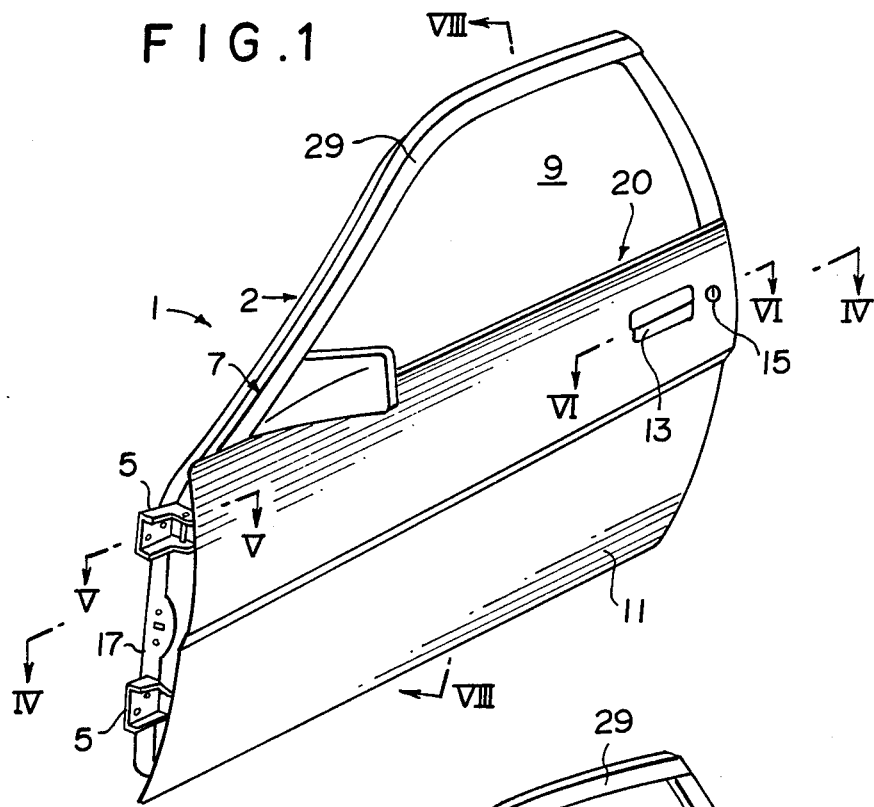
FIG. 1 is a perspective view showing the external appearance of a vehicle door structure in accordance with an embodiment of the present invention.
Figure 2:
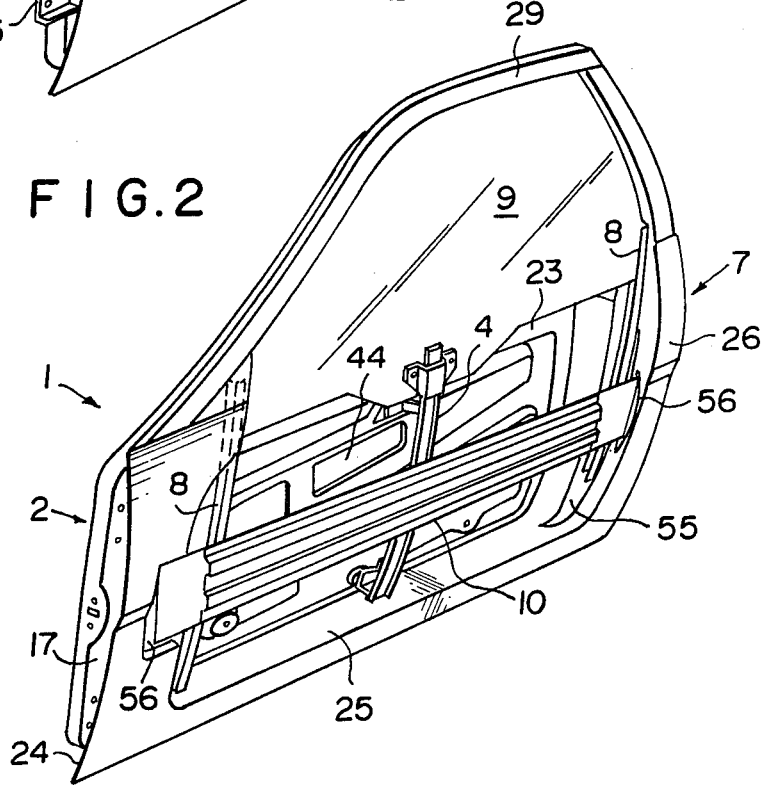
FIG. 2 is a perspective view showing the vehicle door with the outer plate being removed.
Figure 3:
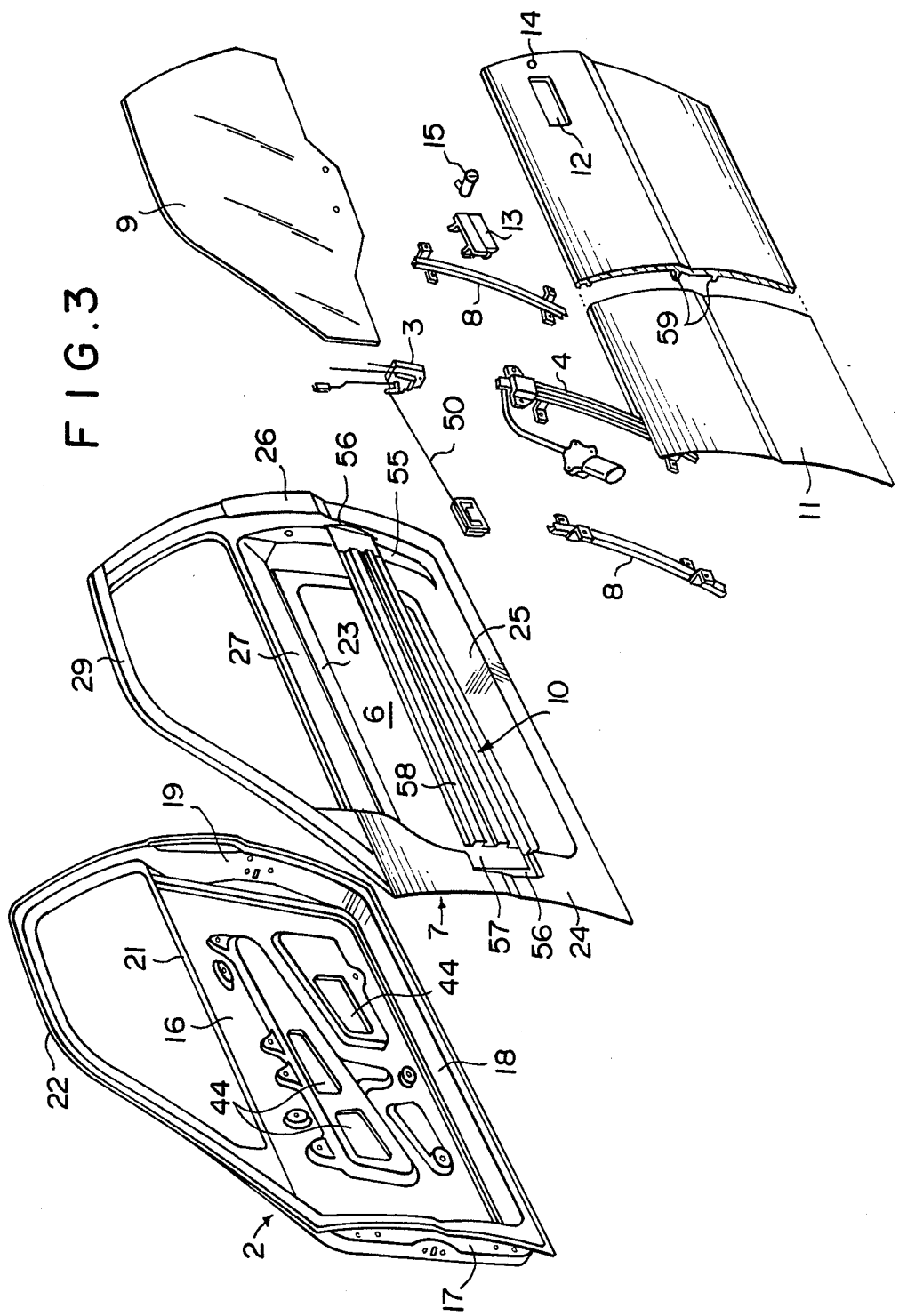
FIG. 3 is an exploded perspective view of the vehicle door.

In FIGS. 1 to 3, a door body 1 comprises an inner panel 2 formed by pressing of a steel plate, and, as functional parts to be mounted on the inner panel 2, a door lock device 3, a window regulator 4, and door hinges 5. The door body 1 further comprises an outer panel 7 having a central opening 6 and formed by pressing of a steel plate, front and rear guide members 8 mounted on the outer panel 7, a windowpane 9 provided flush with the surface fashion and movable up and down under the guidance of guide members 8, a reinforcement 10 mounted on the outer panel 7, a synthetic resin outer plate 11 for covering the outer side surface of the outer panel 7, an outer handle 13 mounted on the outer plate 11 in a rectangular opening 12 formed therein, and a key cylinder 15 mounted on the outer plate 11 in a circular opening 14 formed therein.

The inner panel 2 comprises a panel body 16 and a front flange portion 17, a bottom flange portion 18 and a rear flange portion 19 are integrally formed on the front end, the lower end and the rear end of the panel body 16 to project toward the outer panel 7. Further, the inner panel 2 is provided with an upper edge portion 21 bent toward the outer panel 7 and extending in the longitudinal direction of the vehicle body along the belt line portion 20. Further, a gate-shaped sash 22 is integrally formed on the inner panel 2.

The outer panel 6 comprises a panel body 23 in which the central opening 6 is formed, and a front flange portion 24, a bottom flange portion 25 and a rear flange portion 26 are integrally formed on the front end, the lower end and the rear end of the panel body 23 to project outwardly. Further, the outer panel 7 is provided with an upper edge portion 27 extending in the longitudinal direction of the vehicle body along the belt line portion 20. As clearly shown in FIG. 8, the upper edge portion 27 is bent upward at a position inside the line 28 along which a windowpane 9 is moved up and down. Further, a gate-shaped sash 29 is integrally formed on the outer panel 7.

Figure 4:
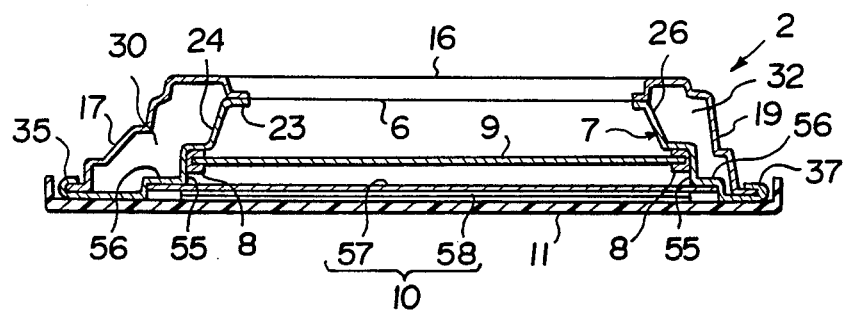
FIG. 4 is a cross-sectional view taken along line IV—IV in FIG. 1.
Figure 8:
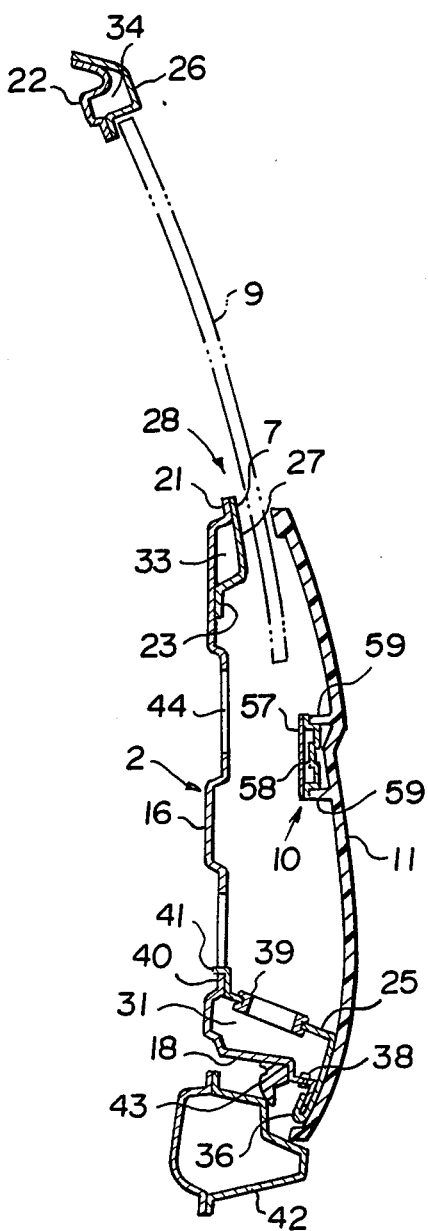
FIG. 8 is a cross-sectional view taken along line VIII—VIII in FIG. 1.

The inner panel 2 and the outer panel 7 are bonded together as shown in FIGS. 2, 4 and 8.

That is, the front flange portion 17, the bottom flange portion 18 and the rear flange portion 19 of the inner panel 2 are respectively lap-jointed to the front flange portion 24, the bottom flange portion 25 and the rear flange portion 26 of the outer panel 7, and the panel bodies 16 and 23 of the inner and outer panels 2 and 7 are bonded together, whereby closed cross-section portions 30, 31 and 32 are formed respectively along the front edge, the bottom edge and the rear edge of the door body 1.

The upper edge portions 21 of the inner panel 2 and the outer edge portion 27 of the outer panel 7 are bonded together to form a closed cross-section portion 33 which extends in the longitudinal direction of the door body 1 along the belt line portion 20 and connects the front edge and the rear edge of the door body 1.

Further, the sash 22 of the inner panel 2 and the sash 29 of the outer panel 7 are bonded together to form a gate-shaped closed cross-section portion 34.

At the closed-cross section portions 30, 31 and 32, the outer end of the outer panel 7 are folded back around the outer end of the inner panel 2 to form hemming portions 35, 36 and 37 as shown in FIGS. 4, 5, 6 and 7.

The bottom flange portion 18 of the inner panel 2 and the bottom flange portion 25 of the outer panel 7 forming the closed cross-section portion 31 are arranged as follows.

As shown in FIG. 8, grommet holes for fitting grommets 38 and 39 are formed in the bottom flange portions 18 and 25, and coating of the inner surface of the closed cross-section portion 31 is effected through the grommet holes before fitting the grommets 38 and 39 into the grommet holes, thereby improving the corrosion prevention effect.

An inner periphery 41 of the panel body 23 of the outer panel 7 defining the central opening 6 is inwardly bent in an L-shape over a wall portion 40 of the inner panel 2 to improve the seal therebetween. On the lower side of the bottom flange portion 18 of the inner panel 2 is bonded a seal member 43, e.g., a weather strip, which is adapted to abut against a side sill 42. Further, a plurality of openings 44 for servicing are formed in the panel body 16 of the inner panel 2.

Figure 5:
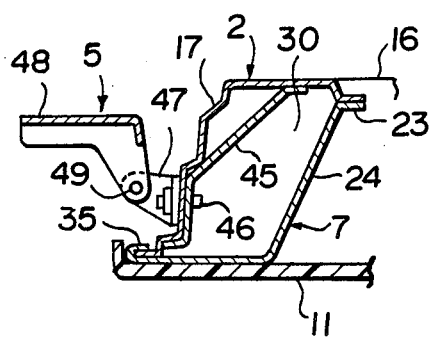
FIG. 5 is a cross-sectional view taken along line V—V in FIG. 1.

In the closed cross-section portion 30 on the front side or the door hinge side of the door body 1, a hinge reinforcement 45 is provided to extend across the closed cross-section as shown in FIG. 5.

In this particular embodiment, the hinge reinforcement 45 is welded to the front flange portion 17 of the inner panel 2. The door hinges 5 are mounted by set bolts 46 on the lap of the hinge reinforcement 45 and the front flange portion 17. Each door hinge 5 comprises a hinge male 47 and a hinge female 48 pivotally connected with each other by a hinge pin 49.

Figure 6:
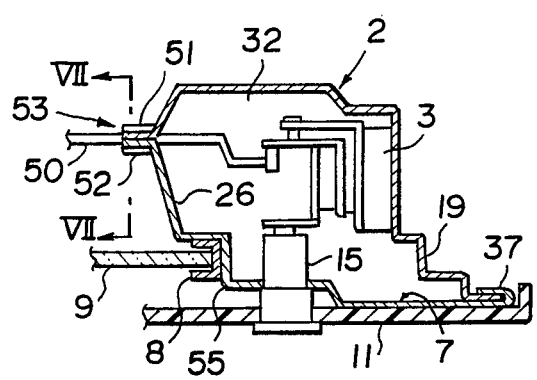
FIG. 6 is a cross-sectional view taken along line VI—VI in FIG. 1.

In the closed cross-section portion 32 on the rear side, the door lock device 3 and the body portion of the key cylinder 15 are disposed as shown in FIG. 6. A pair of servicing holes are provided above and below the mounting portion of the door lock device 3 and mounting of the door lock device 3 is effected through the servicing holes.

Figure 7:
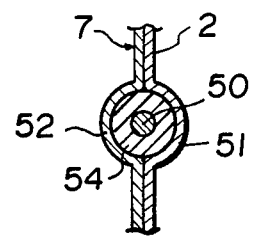
FIG. 7 is a cross-sectional view taken along line VII—VII in FIG. 6.

Further, as shown in FIG. 7, a space for inserting a control rod 50 connecting the door lock device 3 with an inner handle (not shown) is provided in the lap of the inner panel 2 and the outer panel 7. That is, a part of the lap of the inner and outer panels 2 and 7 is bowed to form bowed portions 51 and 52, thereby forming therebetween a space 53 for inserting the control rod 50. After the control rod 50 is inserted into the space 50, a sealing grommet 54 is inserted to plug the gap. By thus plugging the gap by the sealing grommet 54, water, dust and the like are prevented from entering the closed-cross section portion 32, and at the same time, noises generated in response to sliding movement of the control rod 50 upon opening or closure of the door are attenuated.

The front flange portion 24 and the rear flange portion 26 of the outer panel 7 respectively forming part of the closed cross-section portion 30 and 32 are provided with L-shaped recesses for forming mounting seats 55. On the mounting seats 55 are fixedly mounted a pair of channel shaped guide members 8 by screws as shown in FIG. 4. The windowpane 9 is moved up and down under the guidance of the guide members 8.

Further, the front flange portion 24 and the rear flange portion 26 are respectively provided on the outer side of the mounting seats 55 for the guide members 8 with mounting seats 56 for the reinforcement 10. The reinforcement 10 is welded to the mounting seats 56. The reinforcement 10 comprises a flat plate 57 and a plate 58 having a corrugated face bonded together as shown in FIGS. 3, 4 and 8, and extends in the longitudinal direction of the door body 1 to connect predetermined portions of the outer panel 7.

On the inner surface of the outer plate 11 for covering the outer surface of the outer panel 7, a pair of inwardly projecting reinforcement ribs 59 are integrally formed at portions respectively corresponding to the upper and lower surfaces of the plate 58 as shown in FIGS. 3 and 8.

More particularly, the reinforcement ribs 59 extend in the longitudinal direction of the door body 1 respectively opposed to upper and lower engagement portions provided on the plate 58, and when the outer plate 11 is mounted on the outer panel 7, the outer plate 11 is tacked to the outer panel 7 by virtue of engagement of the reinforcement ribs 59 with the upper and lower engagement portions of the plate 58. Though the outer plate 11 is bonded to the outer surface of the outer panel 7 by adhesive after the tacking, if desired, the outer plate 11 is screwed to the outer panel 7 at a plurality of portions.

As can be understood from the description above, as the door body 1 is of a skeletal structure formed of the closed cross-section portions 30 and 32 at the front and rear sides, the rigidity of the door body 1 itself is enhanced. Further, since the bottom side of the door body 1 is formed of the closed cross-section portion 31, the strength of the bottom edge of the door body 1 opposed to the side sill 42 is enhanced and accordingly, intrusion of the door body into the passenger compartment upon sideway collision can be prevented.

Further, since the inner panel 2 and the outer panel 7 are formed by the pressing of steel plate, for instance, and the functional parts such as the window regulator 4, the door hinges 5 and the like are mounted on the inner panel 2 thus formed, the mounting rigidity of the functional parts is enhanced.

Further, since the outer panel 7 is provided with the central opening 6 and the functional parts can be mounted on the inner panel 2 from outside through the central opening 6, workability in mounting the functional parts can be improved.

Further, since the outer plate 11 is bonded on the outer side of the outer panel 7 to cover the central opening 6, the external appearance of the door body 1 is not degraded.

Though not shown, the inner panel 2 is lined with a door trim.

We claim:

1. A vehicle door structure comprising an inner panel on which functional parts are to be mounted, and an outer panel having a central opening, the inner panel and the outer panel being lap-bonded together at the front edge, the bottom edge and the rear edge, the portion of the outer panel surrounding the central opening being bonded to the inner panel, at least front and rear edge portions of the door body being formed of closed cross-section portions, and the outer side of the outer panel being covered with an outer plate of synthetic resin.

2. A vehicle door structure as defined in claim 1 in which the bottom edge portion of the door body is formed of a closed cross-section portion connected to the closed cross-section portions forming the front and rear edge portions.

3. A vehicle door structure as defined in claim 2 further comprising a reinforcement connecting the closed cross-section portions forming the front and rear edge portions.

4. A vehicle door structure as defined in claim 3 in which the front and rear end portions of the reinforcement are respectively fixed to mounting seats formed on the front and rear side of the central opening of the outer panel.

5. A vehicle door structure as defined in claim 3 in which said outer plate is provided with a pair of reinforcement ribs projecting inwardly from the inner surface of the outer plate, the reinforcement ribs extending in the longitudinal direction of the door body at portions corresponding to the upper and lower surfaces of said reinforcement connecting the closed cross-section portions forming the front and rear edge portions.

6. A vehicle door structure as defined in claim 2 in which a body portion of a door lock device and a key cylinder body are disposed in the cross-section of the closed cross-section portion forming the front edge portion or the rear edge portion.

7. A vehicle door structure as defined in claim 2 in which a door hinge is mounted on the closed cross-section portion forming the front edge portion or the rear edge portion by way of a hinge reinforcement which is provided to extend across the closed cross-section.

8. A vehicle door structure as defined in claim 2 in which a pair of mounting seats for mounting guide members for guiding up-and-down movement of a windowpane are provided on the front and rear edge portions of the outer panel.

9. A vehicle door structure as defined in claim 8 in which each of the mounting seats is formed of a recessed portion formed on the side of the outer panel facing the inner panel.

10. A vehicle door structure as defined in claim 2 in which the outer panel is provided with an upper edge portion formed integrally with the outer panel to extend in the longitudinal direction of the door body along the belt line portion, the upper edge portion being bent at a position inside the line along which a windowpane is moved up and down, and the bent portion is mounted on the inner panel to form a closed cross-section which extends in the longitudinal direction of the door body and connects the front and rear edge portions.

11. A vehicle door structure as defined in claim 2 in which the front edge portion, the bottom edge portion and the rear edge portion of the inner panel are bent toward the outer panel, and the inner peripheral edge portion of the outer panel defining the central opening is bent toward the inner panel.

12. A vehicle door structure as defined in claim 2 in which each of the inner and outer panels is integrally provided with a gate-shaped sash portion, and a sash having a closed cross-section is formed by the sash portions of the inner and outer panels.

13. A vehicle door structure as defined in claim 1 further comprising a reinforcement connecting the closed cross-section portions forming the front and rear edge portions.

14. A vehicle door structure as defined in claim 1 in which a body portion of a door lock device and a key cylinder body are disposed in the cross-section of the closed cross-section portion forming the front edge portion or the rear edge portion.

15. A vehicle door structure as defined in claim 1 in which a door hinge is mounted on the closed cross-section portion forming the front edge portion or the rear edge portion by way of a hinge reinforcement which is provided to extend across the closed cross-section.

16. A vehicle door structure as defined in claim 1 in which a pair of mounting seats for mounting guide members for guiding up-and-down movement of a windowpane are provided on the front and rear edge portions of the outer panel.

* * * * *